(12) United States Patent
Vandeputte

(10) Patent No.: US 10,465,520 B2
(45) Date of Patent: Nov. 5, 2019

(54) BLADE WITH CORRUGATED OUTER SURFACE(S)

(71) Applicant: General Electric Company, Schenectady, NY (US)

(72) Inventor: Thomas William Vandeputte, Scotia, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 441 days.

(21) Appl. No.: 15/217,012

(22) Filed: Jul. 22, 2016

(65) Prior Publication Data
US 2018/0023397 A1 Jan. 25, 2018

(51) Int. Cl.
*F01D 5/14* (2006.01)
*F01D 9/04* (2006.01)
(Continued)

(52) U.S. Cl.
CPC .......... *F01D 5/145* (2013.01); *B23K 15/0086* (2013.01); *B23K 15/0093* (2013.01); *B23K 26/342* (2015.10); *F01D 5/141* (2013.01); *F01D 5/147* (2013.01); *F01D 9/041* (2013.01); *F01D 9/065* (2013.01); *B23K 2101/001* (2018.08); *B23K 2103/26* (2018.08); *B29L 2031/08* (2013.01); *B33Y 50/02* (2014.12); *B33Y 80/00* (2014.12); *F05D 2240/121* (2013.01);
(Continued)

(58) Field of Classification Search
CPC .......... F01D 5/145; F01D 5/141; F01D 5/147; F01D 9/041; F01D 9/065
See application file for complete search history.

(56) References Cited

U.S. PATENT DOCUMENTS 3,650,635 A 3/1972 Wachtell et al.
4,830,315 A * 5/1989 Presz, Jr. ................ B64C 21/10
114/102.29
(Continued)

FOREIGN PATENT DOCUMENTS

JP 63-195302 8/1988
JP 07-332007 12/1995
WO 2015/191041 12/2015

OTHER PUBLICATIONS

Denton "The Trailing Edge Loss of Transonic Turbine Blades" Journal of Turbomachinery, Apr. 1990, vol. 112 p. 277-285.
(Continued)

Primary Examiner — Woody A Lee, Jr.
Assistant Examiner — Sabbir Hasan
(74) Attorney, Agent, or Firm — Christopher R. Carroll; The Small Patent Law Group LLC

(57) ABSTRACT

A blade includes an airfoil body defined by a concave pressure side outer wall and a convex suction side outer wall that connect along a leading edge and a trailing edge. The blade also includes a first corrugated surface extending from the trailing edge to the leading edge on an outer surface of the concave pressure side outer wall, and/or a second corrugated surface extending from the trailing edge to the leading edge on an outer surface of the convex suction side outer wall. The blade acts to reduce flow velocity losses associated with wake mixing by accelerating the mixing process from the source of the wake to minimize inflated unsteady mixing that occurs within a downstream blade row.

11 Claims, 12 Drawing Sheets

(51) Int. Cl.
B23K 26/342 (2014.01)
B23K 15/00 (2006.01)
F01D 9/06 (2006.01)
B33Y 50/02 (2015.01)
B33Y 80/00 (2015.01)
B29L 31/08 (2006.01)
B23K 101/00 (2006.01)
B23K 103/18 (2006.01)

(52) U.S. Cl.
CPC .. *F05D 2240/122* (2013.01); *F05D 2240/303* (2013.01); *F05D 2240/304* (2013.01); *F05D 2250/181* (2013.01); *F05D 2250/182* (2013.01); *F05D 2250/183* (2013.01); *F05D 2250/184* (2013.01); *F05D 2250/61* (2013.01); *F05D 2260/204* (2013.01); *F05D 2260/22141* (2013.01); *Y02T 50/673* (2013.01); *Y02T 50/676* (2013.01)

(56) References Cited

U.S. PATENT DOCUMENTS

| | | | |
|---|---|---|---|
| 5,704,763 | A | 1/1998 | Lee |
| 6,092,766 | A | 7/2000 | LaRoche et al. |
| 6,733,240 | B2 | 5/2004 | Gliebe |
| 7,156,619 | B2 | 1/2007 | Papple |
| 7,303,376 | B2 | 12/2007 | Liang |
| 7,377,746 | B2 | 5/2008 | Brassfield et al. |
| 7,736,123 | B2 | 6/2010 | Lee et al. |
| 7,871,246 | B2 | 1/2011 | Liang |
| 7,972,115 | B2 | 7/2011 | Potier |
| 8,414,263 | B1 | 4/2013 | Liang |
| 8,419,372 | B2 | 4/2013 | Wood et al. |
| 8,506,836 | B2 | 8/2013 | Szuromi et al. |
| 8,573,541 | B2 | 11/2013 | Sullivan et al. |
| 8,608,429 | B2 | 12/2013 | Gupta et al. |
| 8,814,529 | B2 | 8/2014 | Fiala et al. |
| 8,910,361 | B2 | 12/2014 | Rickenbacher et al. |
| 8,944,774 | B2 | 2/2015 | Bielek |
| 9,062,554 | B2 | 6/2015 | Bielek |
| 9,121,294 | B2 | 9/2015 | Kray et al. |
| 9,249,666 | B2 | 2/2016 | Wood et al. |
| 9,267,383 | B2 | 2/2016 | Batt et al. |
| 2012/0216542 | A1 | 8/2012 | Siden et al. |
| 2013/0156549 | A1 | 6/2013 | Maldonado |
| 2013/0291548 | A1 | 11/2013 | Ingram et al. |
| 2014/0301860 | A1 | 10/2014 | Ramm et al. |
| 2015/0086408 | A1 | 3/2015 | Kottilingam et al. |
| 2015/0114003 | A1 | 4/2015 | McMahan et al. |
| 2015/0147164 | A1 | 5/2015 | Cui et al. |
| 2015/0147585 | A1 | 5/2015 | Schwarze et al. |
| 2015/0167979 | A1 | 6/2015 | Siden et al. |
| 2015/0184519 | A1 | 7/2015 | Foster et al. |
| 2015/0184537 | A1 | 7/2015 | Smith |
| 2015/0198050 | A1 | 7/2015 | Lee et al. |
| 2016/0069185 | A1 | 3/2016 | Stankowski et al. |
| 2017/0159442 | A1* | 6/2017 | Velazquez, Jr. ......... B64C 21/10 |

OTHER PUBLICATIONS

Pallos "Gas Turbine Repair Technology" GER-3957B (04/01) 30 pages.
U.S. Appl. No. 15/217,062, Office Action dated Jan. 17, 2019, 23 pages.
U.S. Appl. No. 15/217,041, Office Action dated Jan. 30, 2019, 24 pages.
U.S. Appl. No. 15/217,033, Office Action dated Feb. 4, 2019, 17 pages.
U.S. Appl. No. 15/217,053, Office Action dated Feb. 4, 2019, 25 pages.
U.S. Appl. No. 15/217,062, Final Office Action dated Apr. 18, 2019, 30 pages.
U.S. Appl. No. 15/217,033, Notice of Allowance dated Jun. 12, 2019, 13 pgs.
U.S. Appl. No. 15/217,041, Notice of Allowance dated Jun. 3, 2019, 10 pgs.

* cited by examiner

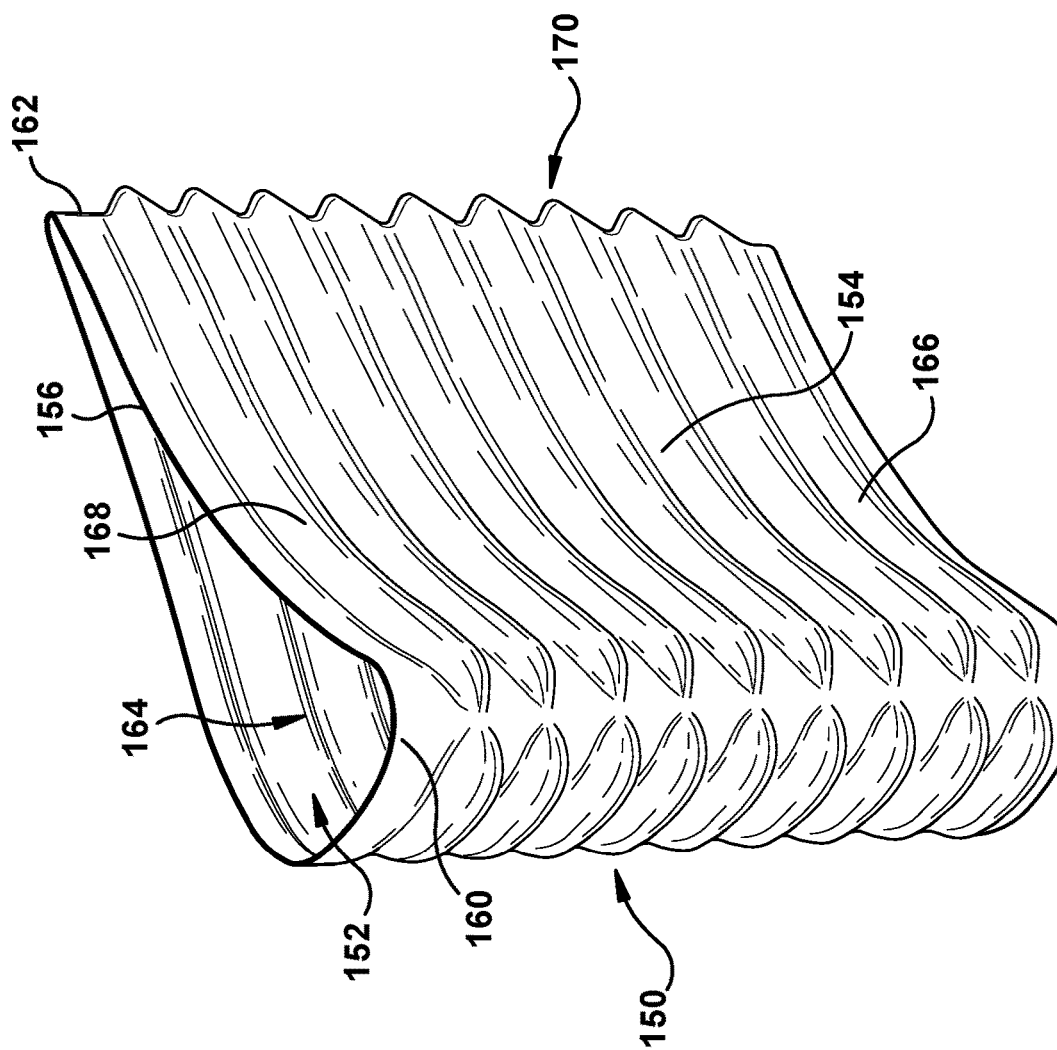

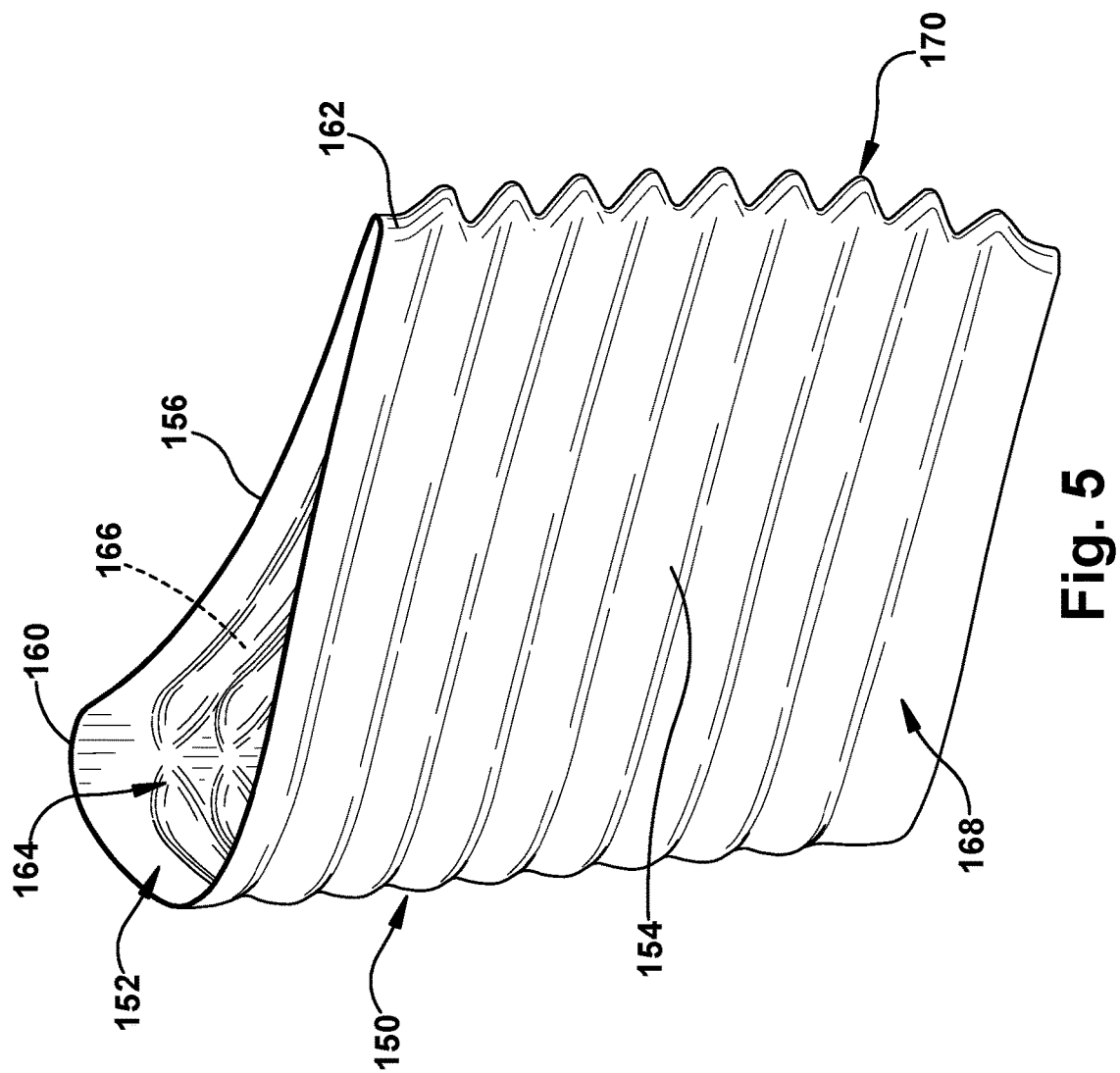

BLADE WITH CORRUGATED OUTER SURFACE(S)

BACKGROUND OF THE INVENTION

The disclosure relates generally to turbomachine blades, and more particularly, to a blade having one or more corrugated outer surfaces to accelerate a mixing process from the source of a wake to minimize inflated unsteady mixing that occurs within a downstream blade row.

Turbomachine blades include airfoils that accelerate flow through contraction of area and the introduction of tangential velocity. The relative flow velocity exiting, for example, a gas turbine airfoil is quite high, typically with Mach numbers of 0.5 or higher. The finite thickness of an airfoil trailing edge, however, creates a velocity deficit, i.e., a wake, which introduces losses in the flow through viscous mixing. FIG. 1 shows an example of a typical unsteady loss process for a turbine rotating blade row 10 operating behind a turbine stationary vane row 12. At location 14, a wake is generated by a finite trailing edge thickness of the airfoil of vane row 12, resulting in aerodynamic losses due to mixing of the wake with the mainstream. At location 16, the wake interacts with a potential field of a downstream rotating blade row 10, and it begins to distort. At location 18, the wake is segregated into discrete packages by the leading edge of airfoils in downstream rotation blade row 10. At location 20, a pressure gradient in the airfoil passage (between blades of blade row 10) causes wake packets to stretch and migrate, causing aerodynamic losses due to mixing of the wake packets (referred to as "free stream mixing"). That is, when the wake is ingested into a downstream stationary blade row 10, the wake undergoes a stretching and dilation process that magnifies the losses associated with the mixing. At location 22, the wake packets interact with the boundary layer of the blades in blade row 10 downstream of the airfoils' wake, causing further aerodynamic losses (referred to as "airfoil surface losses"). Unsteady loss caused by this phenomenon is present in all turbomachinery in various forms.

In order to address the above challenges, blades having airfoils with enhanced wake mixing structures have been proposed. The wave mixing structures can take a variety of forms such as crenulated or serrated trailing edges on the airfoils. These structures, however, have been limited to trailing edges of the airfoil.

BRIEF DESCRIPTION OF THE INVENTION

A first aspect of the disclosure provides a blade including: an airfoil body defined by a concave pressure side outer wall and a convex suction side outer wall that connect along a leading edge and a trailing edge; and at least one of: a first corrugated surface extending from the trailing edge to the leading edge on an outer surface of the concave pressure side outer wall, and a second corrugated surface extending from the trailing edge to the leading edge on an outer surface of the convex suction side outer wall.

A second aspect of the disclosure provides a turbomachine, including: a first row of blades coupled to a turbomachine rotor for rotating with the turbomachine rotor; a second row of blades coupled to a stationary casing of the turbomachine and axially adjacent the first row of blades; each blade in the first and second row of blades including an airfoil body defined by a concave pressure side outer wall and a convex suction side outer wall that connect along a leading edge and a trailing edge; an upstream one of the first row and the second row of blades having each blade thereof including: a first corrugated surface extending from the trailing edge to the leading edge on an outer surface of the concave pressure side outer wall; and a second corrugated surface extending from the trailing edge to the leading edge on an outer surface of the convex suction side outer wall.

A third aspect of the disclosure provides a non-transitory computer readable storage medium storing code representative of a blade, the blade physically generated upon execution of the code by a computerized additive manufacturing system, the code including: code representing the blade, the blade including: an airfoil body defined by a concave pressure side outer wall and a convex suction side outer wall that connect along a leading edge and a trailing edge; and at least one of: a first corrugated surface extending from the trailing edge to the leading edge on an outer surface of the concave pressure side outer wall, and a second corrugated surface extending from the trailing edge to the leading edge on an outer surface of the convex suction side outer wall.

A fourth aspect may include a computerized method of manufacturing a blade for a turbomachine, the computerized method including: receiving code representing the blade, the blade including: an airfoil body defined by a concave pressure side outer wall and a convex suction side outer wall that connect along a leading edge and a trailing edge; and at least one of: a first corrugated surface extending from the trailing edge to the leading edge on an outer surface of the concave pressure side outer wall, and a second corrugated surface extending from the trailing edge to the leading edge on an outer surface of the convex suction side outer wall; converting the code into an additive manufacturing system language; and manufacturing the blade by executing the converted code using the additive manufacturing system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 4 shows a perspective view of a blade having corrugated outer surfaces according to embodiments of the disclosure.

FIG. 5 shows another perspective view of the blade of FIG. 4.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
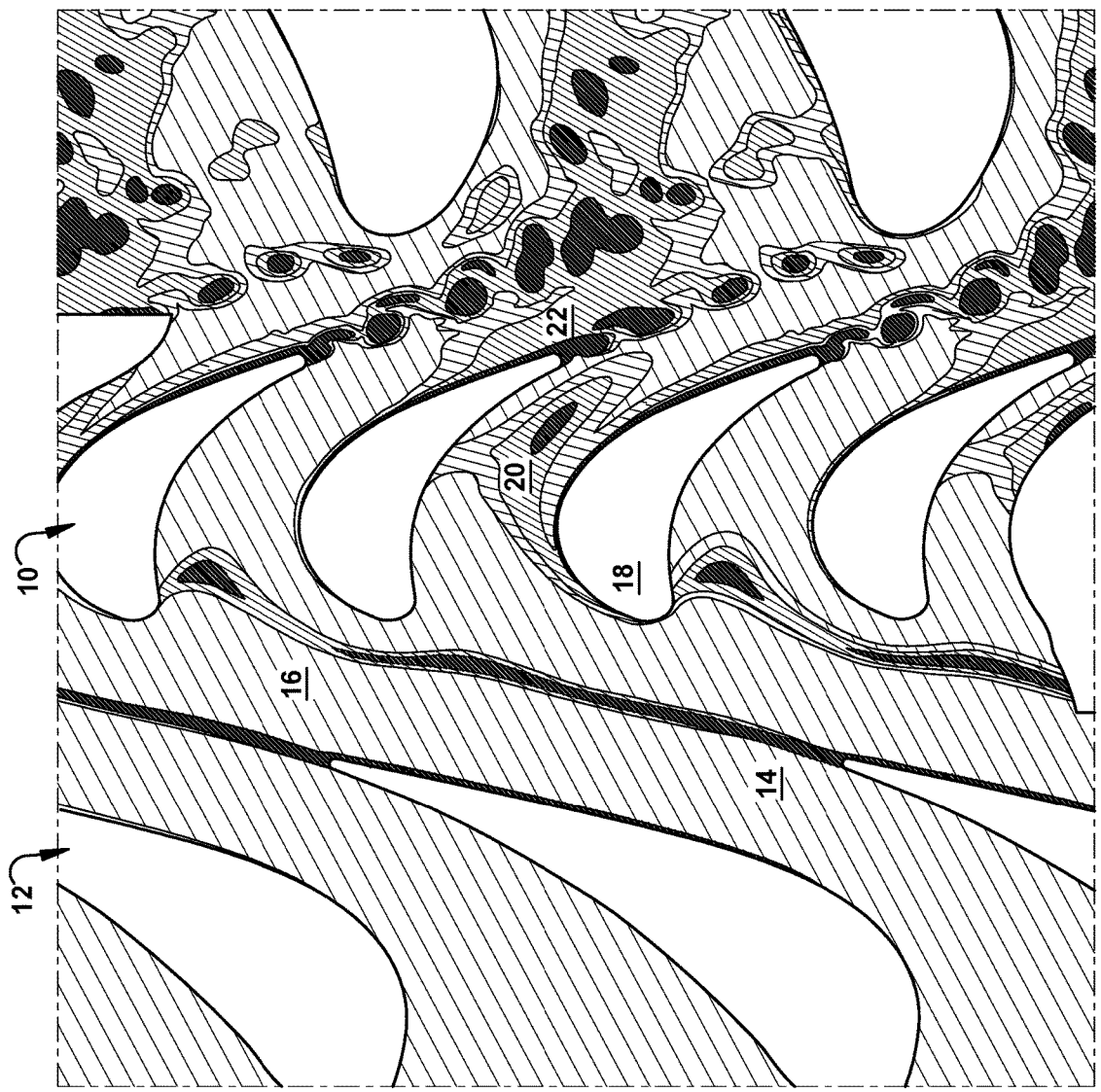
FIG. 1 shows a schematic illustration of conventional aerodynamic flow within a turbomachine.

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbine's component systems. The term "downstream" corresponds to the direction of flow of the fluid, and the term "upstream" refers to the direction opposite to the flow. The terms "forward" and "aft,", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbomachine.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

Figure 2:
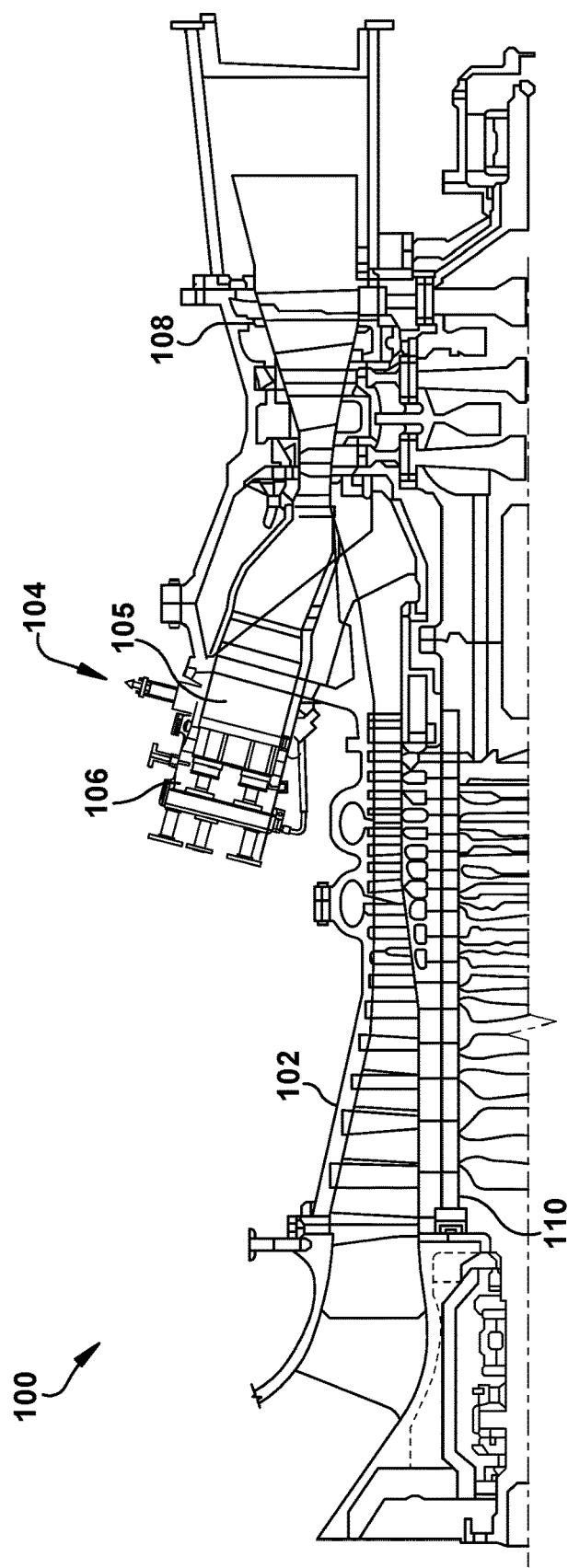
FIG. 2 shows a schematic illustration of an illustrative turbomachine in the form of a gas turbine system.

FIG. 2 shows a schematic illustration of an illustrative turbomachine 100 in the form of a combustion or gas turbine system. Turbomachine 100 includes a compressor 102 and a combustor 104. Combustor 104 includes a combustion region 105 and a fuel nozzle assembly 106. Turbomachine 100 also includes a turbine 108 and a common compressor/turbine shaft 110 (sometimes referred to as rotor 110). In one embodiment, the combustion turbine engine is a MS9001FB engine, sometimes referred to as a 9FB engine, commercially available from General Electric Company, Greenville, S.C. The present disclosure is not limited to any one particular combustion turbine engine and may be implanted in connection with other engines including, for example, the MS7001FA (7FA) and MS9001FA (9FA) engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to rotor 110. In the illustrative embodiment, there is a plurality of combustors 104 and fuel nozzle assemblies 106. In the following discussion, unless otherwise indicated, only one of each component will be discussed.

Figure 3:
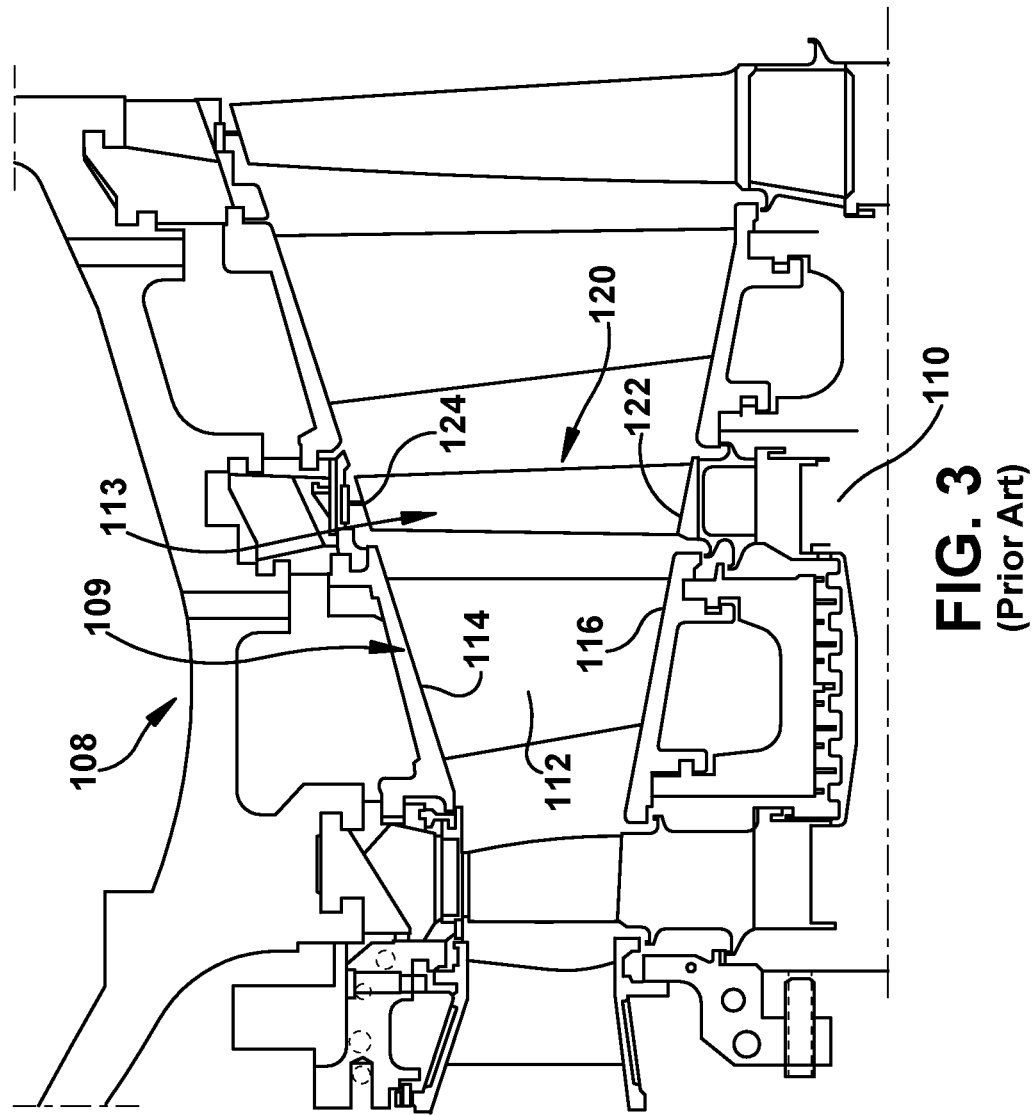
FIG. 3 shows a cross-section illustration of an illustrative gas turbine assembly with three nozzle-rotor pairs that may be used with the gas turbine system in FIG. 2.

FIG. 3 shows a cross-section illustration of an illustrative turbine assembly 108 of turbomachine 100 (FIG. 1) with three nozzle-rotor blade pairs that may be used with the gas turbine system in FIG. 2. Turbine assembly 108 includes a row of blades 109 coupled to a stationary casing 112 of turbomachine 100 and axially adjacent another row of blades 113. Here, row of blades 109 includes stationary blades or vanes 112. A vane 112 may be held in turbine assembly 108 by a radially outer platform 114 and a radially inner platform 116. Row of blades 113 in turbine assembly 108 includes rotating blades 120 coupled to rotor 110 and rotating with the rotor. Rotating blades 120 may include a radially inward platform 122 (at root of blade) coupled to rotor 110 and a radially outward tip 124 (at tip of blade). As used herein, the term "blade" shall refer collectively to stationary vanes or blades 112 and rotating blades 120, unless otherwise stated.

FIGS. 4 and 5 show perspective views of one embodiment of a blade 150 according to embodiments of the disclosure. Embodiments of the disclosure provide blade 150 having corrugated surface(s) on outer surfaces of concave outer wall 154 and/or convex outer wall 156 thereof that act to reduce the overall flow velocity losses associated with wake mixing by accelerating the mixing process from the source of the wake to minimize the inflated unsteady mixing that occurs within a downstream blade row. Blades 150 as described herein may be applied to any upstream blade row in a turbomachine the wake mixing for which is desired prior to a downstream blade row. That is, blades 150 as described herein can be applied to stationary vane/blade rows 109 (FIG. 3), or to rotating blade rows 113 (FIG. 3). As shown in FIGS. 4 and 5, each blade 150 may include an airfoil body 152 defined by a concave pressure side outer wall 154 and a convex suction side outer wall 156 that connect along a leading edge 160 and a trailing edge 162. As understood in the field, outer walls 154, 156 form a radially extending passage 164 therein, which may include a wide variety of cooling structures (not shown) such as cooling passages, impingement sleeves, etc., to cool blade 150.

In contrast to conventional blades, as shown in FIG. 4, blade 150 may include a first corrugated surface 166 extending from trailing edge 162 to leading edge 160 on an outer surface of concave pressure side outer wall 154. Further, as shown in FIG. 5, blade 150 may include a second corrugated surface 168 extending from trailing edge 162 to leading edge 160 on an outer surface of convex suction side outer wall 156. Each corrugated surface 166, 168 may be configured as individual sections that define long/short, over/under arced (from nominal arc of the airfoil) staggered radially curved sections, which are stacked at leading edge 160 to form a three-dimensional shape. Leading edge 160 is a non-corrugated radial edge at which outer walls 154 and 156 meet. Corrugated surfaces 166, 168 appear very subtly as they extend from leading edge 160 and gradually increase in amplitude from leading edge 160, but are contiguous from trailing edge 162 to leading edge 160. Corrugated surfaces 166, 168 thus may appear to cover approximately 90% of the airfoil's surface length from trailing edge 162 to leading edge 160. The reason for the near leading edge variations being so subtle is that all radial sections are configured to the same leading edge parameters such as leading edge diameter (value of minor axis of defining ellipse), ellipse ratio (major axis to minor axis—approximately 1, so nearly circular), leading edge angle (angle of ellipse major axis to turbine axis), and leading edge wedge angles (angle between suction side or pressure side outer wall and defining ellipse). Corrugated surfaces 166, 168 may take any form having alternating ridges and grooves. As shown in FIGS. 4 and 5, corrugated surfaces 166, 168 are sinusoidal, i.e., having identical rounded ridges and grooves of equal amplitude and wavelength.

In operation, corrugated surfaces 166, 168 result in an alternating radial pressure gradient along the airfoil body's span. The alternating pressure gradient induces radial movement of flow, coalescing into discrete vortices at the trailing edge of the airfoil body. These vortices enhance the mixing of the airfoil body's wake before entering the downstream row. Enhanced wake mixing can be leveraged in multiple ways. For example, the wake mixing reduces the magnitude of the wake flow impinging on a downstream object such as an adjacent rotating or stationary blade row such that the aeromechanical loading is reduced. Moreover, the wake mixing facilitates reducing the axial distance necessary between blade rows and downstream components. For a given gap between adjacent blade rows, the thermal efficiency of the turbine may be increased through reduction in aerodynamic pressure loss, resulting in higher power density of the turbomachine, e.g., a gas turbine system. As a result, turbomachine efficiency and performance are facilitated to be improved in comparison to turbomachines using blades having airfoil bodies without corrugated surfaces 166, 168.

As shown in FIGS. 4 and 5, in one embodiment, trailing edge 162 includes a crenulated or serrated edge 170 (hereafter "crenulated edge 170") extending in an axially extending direction (downstream of airfoil body 152). Crenulated edge 170 may include a plurality of chevrons defined, as used herein, as triangular serration planform changes that are employed along at least a portion of the trailing edge. While crenulated edge 170 has been illustrated in the form of a serrated edge having a number of spaced chevrons, the edge may include any form of serration, notches, projections, scallops, etc. In any event, crenulated edge 170 meshes with each of first corrugated surface 166 and second corrugated surface 168. That is, crenulated edge 170 transitions smoothly with each corrugated surface 166, 168 and thus has a similar curvature, which further adds to wake mixing. In this fashion, crenulated edge 170 may provide alternating cutback of the airfoil trailing edge 162, which produces a locally shorter airfoil chord for a desired level of turning, and local over and under turning in an alternating pattern along the span that increases mixing.

Figure 10:
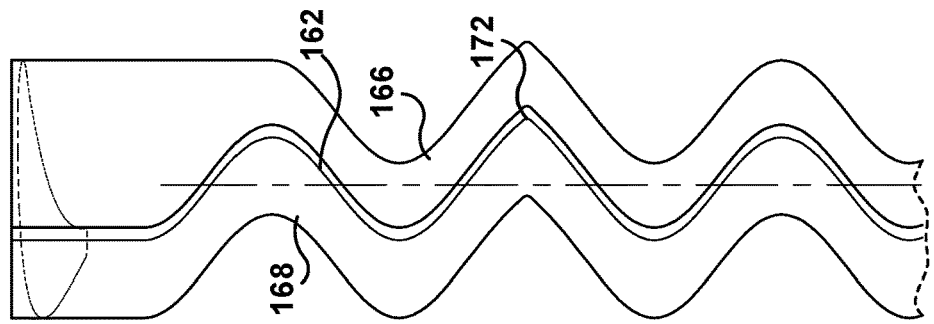
FIGS. 6-10 show an end view of a trailing edge and corrugated surface arrangements for the blade according to various embodiments of the disclosure.
Figure 9:
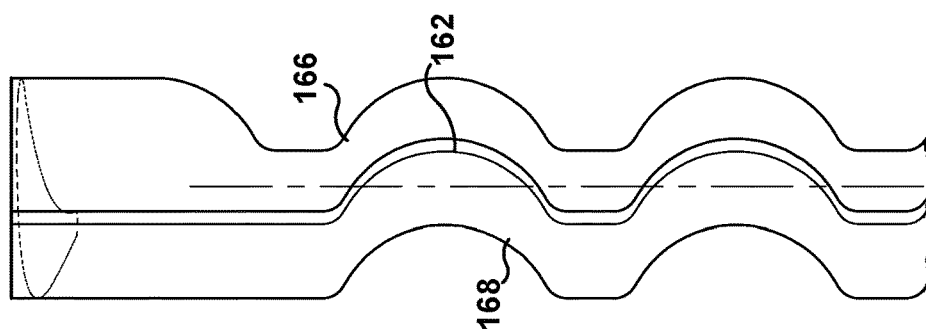
Figure 8:
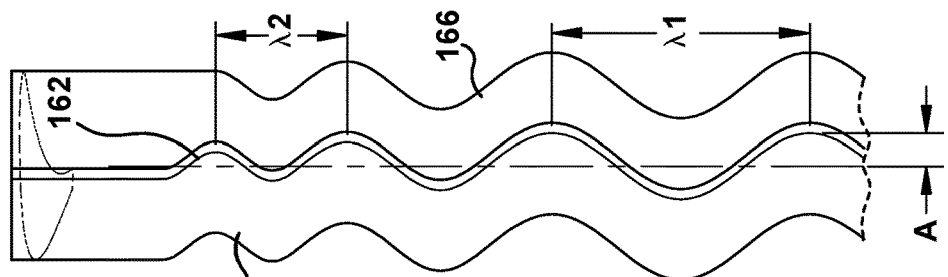
Figure 7:
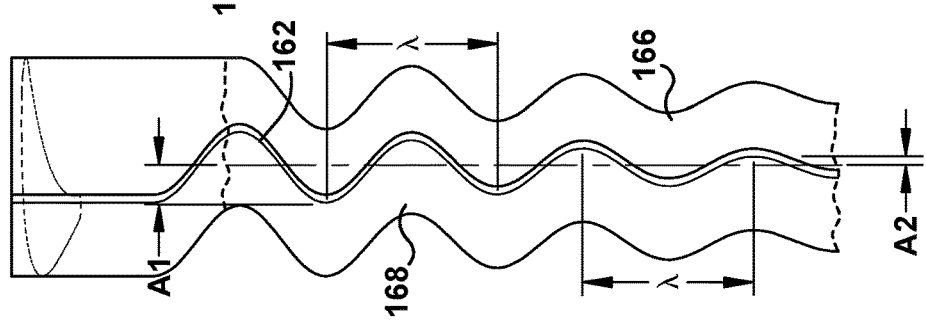
Figure 6:
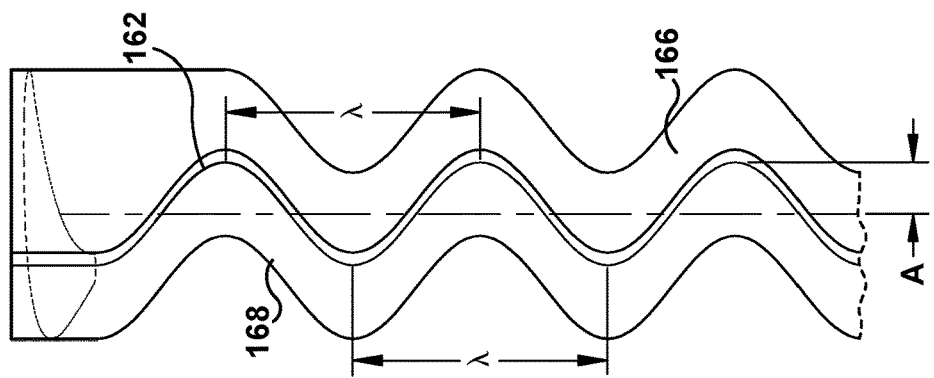

FIGS. 6-10 show end views of some example embodiments of trailing edge 162 shape and also illustrate the different waveforms of corrugated surfaces 166, 168. FIG. 6 shows a trailing edge 162 and corrugated surfaces 166, 168 that are sinusoidal and have identical rounded ridges and grooves of equal amplitude A and wavelength λ (as in FIGS. 4-5) between a root (platform end 122 (FIG. 3)) and a tip (shroud end 126 (FIG. 3)) of blade 150. Here, trailing edge 162 includes a wavy profile along a radially extending axis thereof. FIG. 7 shows a trailing edge 162 and corrugated surfaces 166, 168 that are sinusoidal and have rounded ridges and grooves of equal wavelength λ, but inconsistent amplitude—compare amplitude A1 to A2—between a root (platform end 122 (FIG. 3)) and a tip (shroud end 126 (FIG. 3)) of blade 150. The amplitude may change in any way required to attain the desired wake mixing. FIG. 8 shows a trailing edge 162 and corrugated surfaces 166, 168 that are sinusoidal and have rounded ridges and grooves of equal amplitude A, but inconsistent wavelengths—compare wavelength λ1 to λ2—between a root (platform end 122 (FIG. 3)) and a tip (shroud end 126 (FIG. 3)) of blade 150. The wavelength may change in any way required to attain the desired wake mixing. FIGS. 9 and 10 show examples of a trailing edge 162 where at least one of first and second corrugated surfaces 166, 168 has an inconsistent waveform. In FIG. 9, one corrugated surface 166 is rounded and the other 168 is plateaued. In FIG. 10, both corrugated surfaces 166, 168 are rounded, but one has a ridge 172 therein that is more pointed. Any waveform shape variation may be employed to achieve the desired wake mixing. While the various embodiments of FIGS. 6-10 have been illustrated separately, it is emphasized that they can be combined in any fashion. Corrugated surface(s) 166, 168 can also be varied in a wide variety of ways including, but not limited to: amplitude, wavelength, angle of approach (relative to the rotor), angle of exiting (relative to the rotor), curvature (relative to the rotor), waveform shape, one side or both sides of the airfoil body on which provided, radial extent upon which provided (some or all, continuous or discontinuous), etc.

Figure 11:
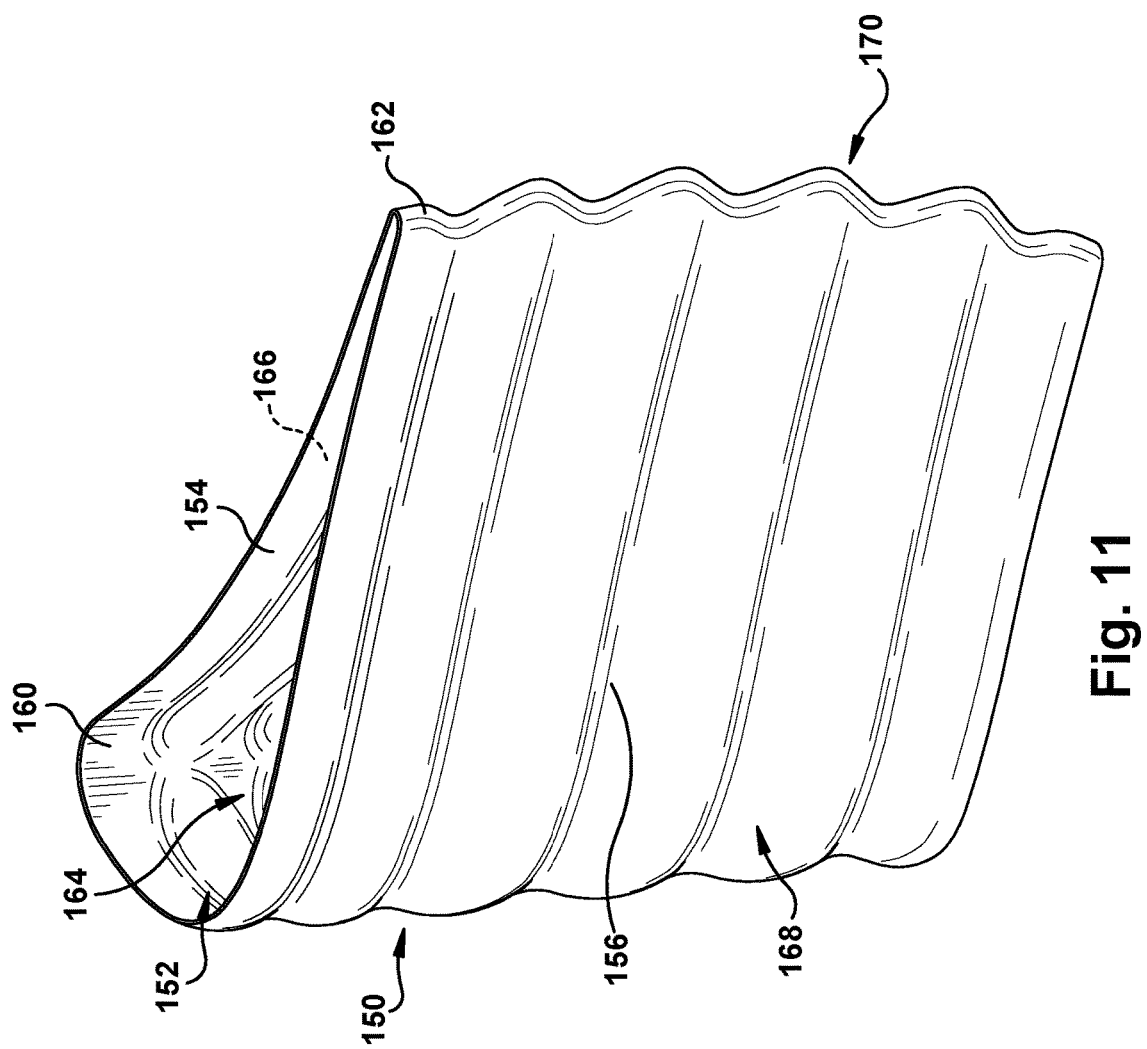
FIGS. 11-14 show alternative embodiments of a blade according to embodiments of the disclosure.
Figure 12:
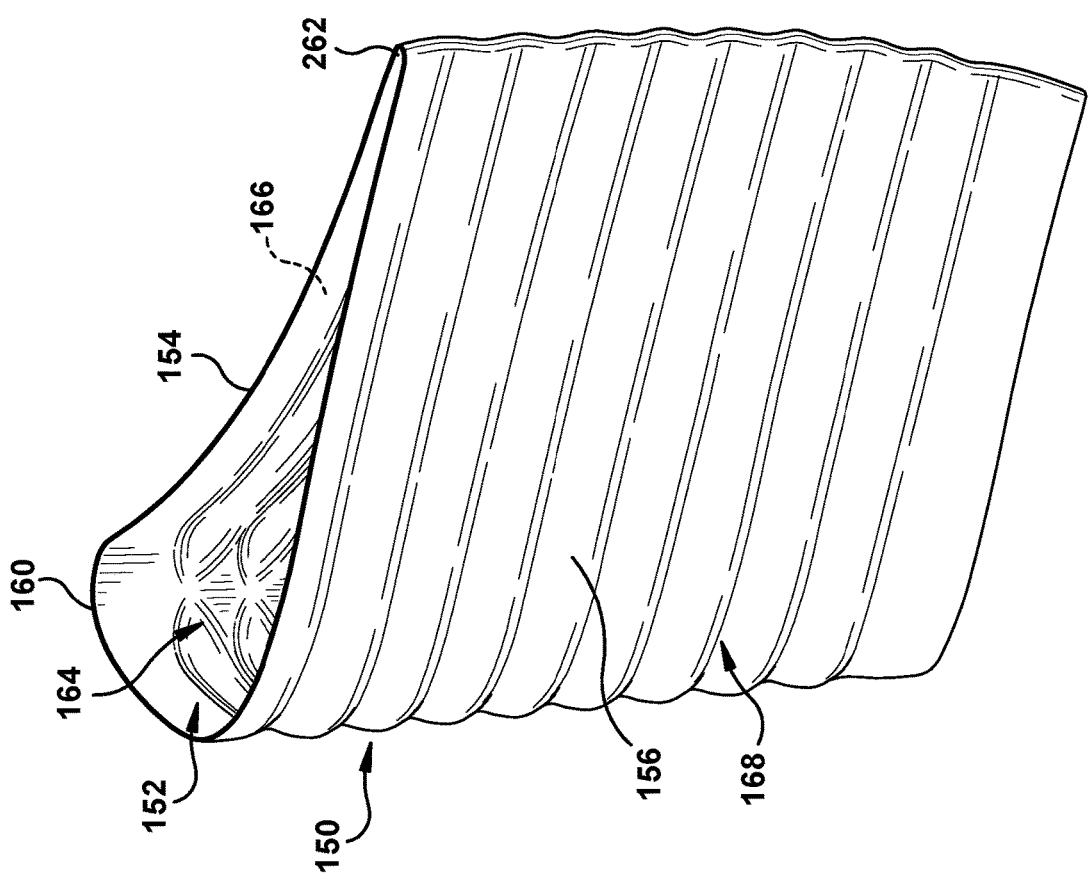
Figure 13:
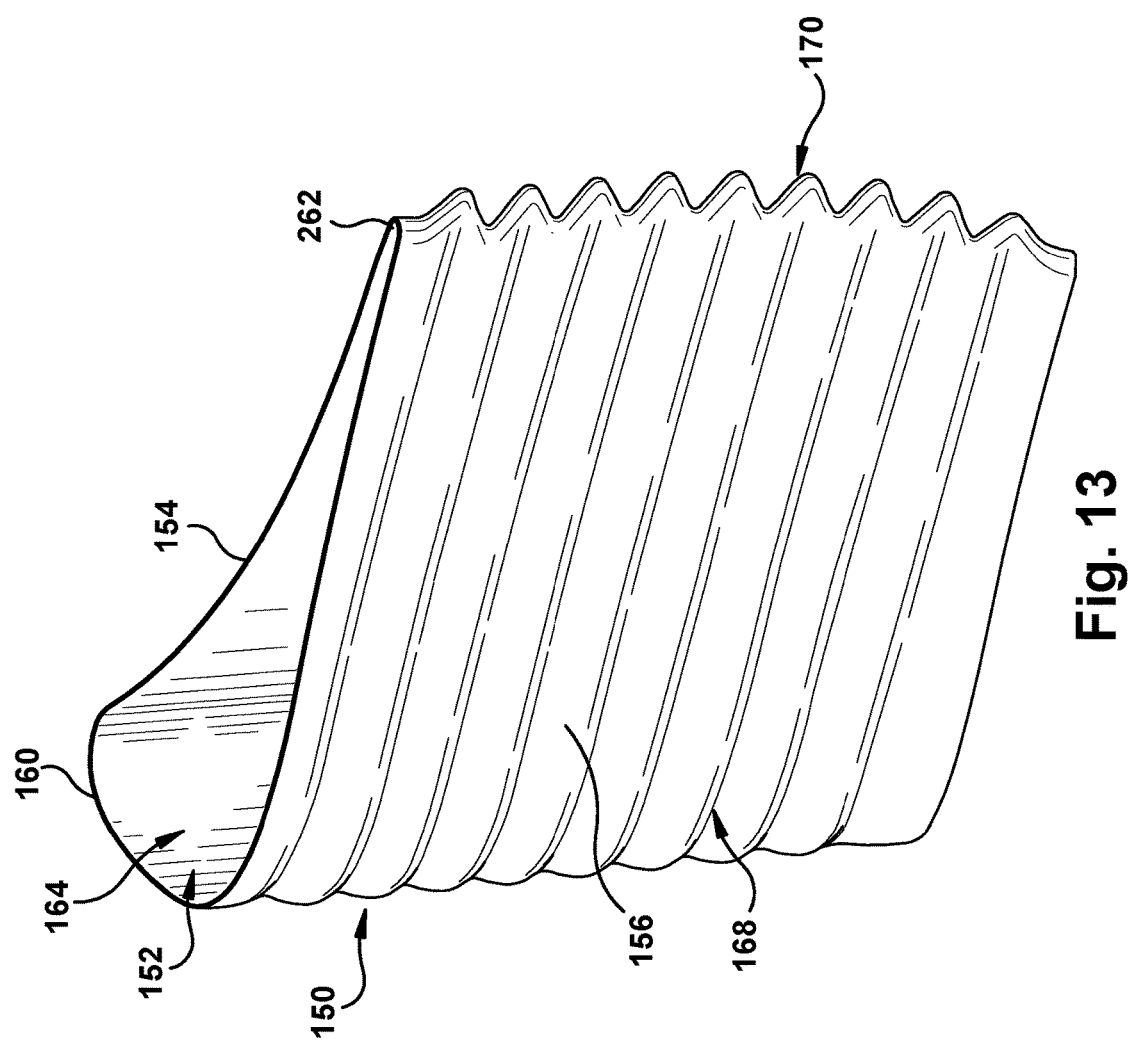
Figure 14:
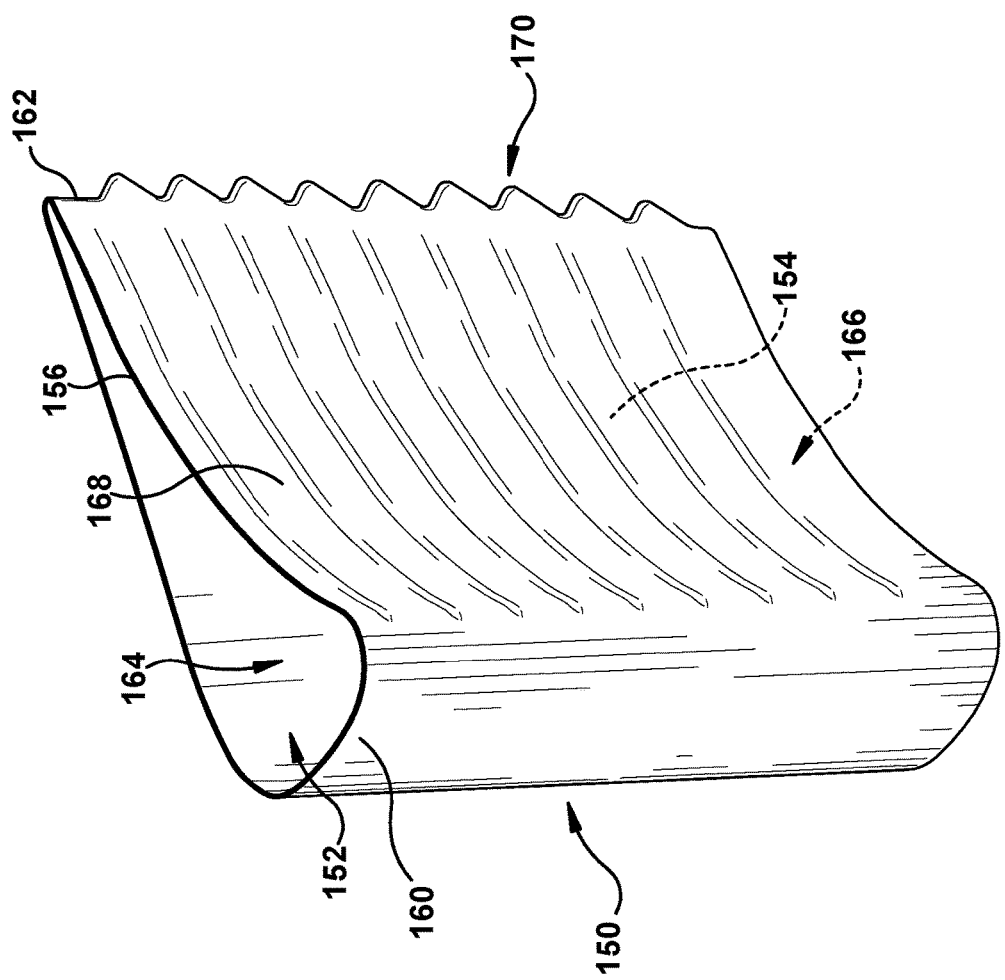

FIGS. 11-14 show perspective views of alternative embodiments of blade 150. FIG. 11 shows a perspective view of another alternative embodiment in which wavelengths have been increased compared to FIGS. 4-6. As illustrated, in the various embodiments, crenulated trailing edge 170 may be resized to accommodate meshing with the various corrugated surfaces(s) 166, 168. FIG. 12 shows a perspective view of another alternative embodiment in which crenulated trailing edge 170 (FIGS. 4 and 5) is removed, and a straight trailing edge 162 is employed with corrugated surfaces(s) 166, 168. Trailing edge 162 would mesh with corrugated surface(s) 166, 168 in the same fashion as crenulated trailing edge 170 (FIGS. 4-5). FIGS. 13 and 14 show perspective views in which a corrugated surface 166, 168 is provided on only one respective outer wall 154, 156. FIG. 13 shows corrugated surface 168 extending from trailing edge 162 to leading edge 160 only on an outer surface of convex, suction side outer wall 156 (no corrugated surface on outer surface of outer wall 154); and FIG. 14 shows corrugated surface 166 extending from trailing edge 162 to leading edge 160 only on an outer surface of concave, pressure side outer wall 154 (no corrugated surface on outer surface of outer wall 156).

Figure 15:
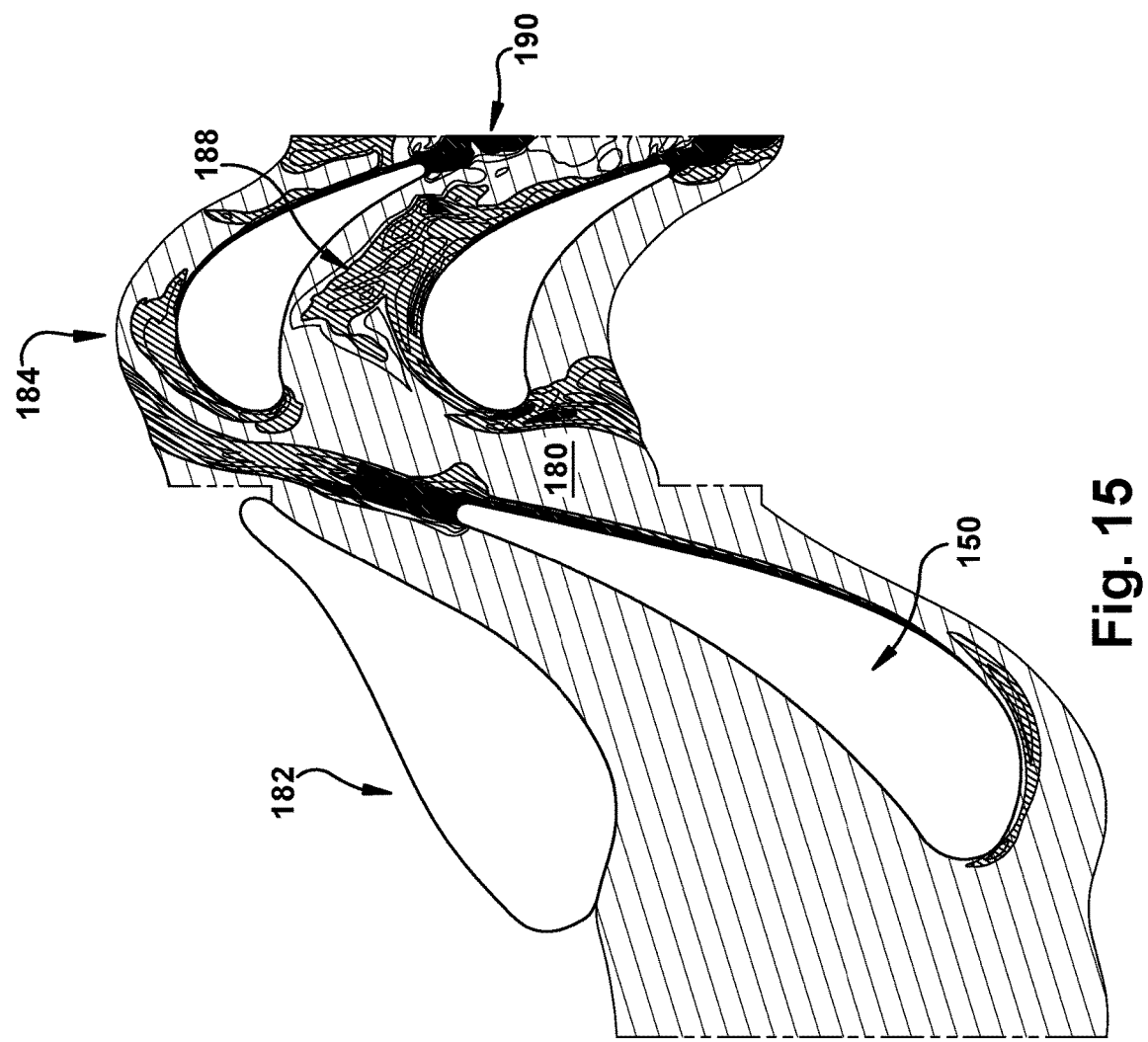
FIG. 15 shows a schematic illustration of an aerodynamic flow within a turbomachine using a blade according to embodiments of the disclosure.

FIG. 15 shows a schematic illustration of an aerodynamic flow within a turbomachine using a blade 150 according to embodiments of the disclosure. In operation, embodiments of the disclosed blade 150 act to enhance the mixing of an airfoil wake in a constant area region 180 between blade rows 182, 184, through the introduction of discrete vortex structures created by corrugated surface(s) 166, 168. The goal of corrugated surface(s) 166, 168 is to minimize the velocity deficit before the wake enters downstream blade row 184, which reduces the generation of mixing loss within downstream blade row 184: compare location 188 in FIG. 15 with location 20 in FIG. 1, and location 190 in FIG. 15 with location 22 in FIG. 1. Moving the mixing loss from within downstream blade row 184 to constant area gap region 180 ahead of downstream blade row 184 thus produces a net gain in efficiency. Blade 150 provides this functionality without having to reduce the strength of the wake (e.g., by reducing the diameter of the trailing edge), which is impractical due to mechanical and thermal concerns. Blade 150 also does not require increasing the space for the wake to mix before entering downstream blade row 184, which may result in a higher net loss due to friction losses associated with the longer inner and outer walls of the flowpath and creates a longer turbomachine, which increases cost and lowers power density. Blade 150 also removes the need for complex air jets to create the mixing. Note, that the use of numerical differentiators such as "first," "second," etc. in the claims is not meant to limit the axial position of blade 150 in any turbomachine—it can be applied at any stage.

Blade 150 may be made of any now known or later developed material appropriate for the thermal and mechanical environment in which it will be employed. Blade 150 may be formed in a number of ways. In one embodiment, blade 150 may be formed by any now known or later developed casting processes employed for turbomachine blades. In one embodiment, however, additive manufacturing is particularly suited for manufacturing blade 150. In this regard, each surface and, in particular, corrugated surface(s) 166, 168 may include surfaces extending at no greater than 45° relative to horizontal. That is, none of the ridges or grooves of corrugate surface(s) 166, 168 or edges of crenulated trailing edge 170 extend at greater than 45° relative to horizontal.

As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 16:
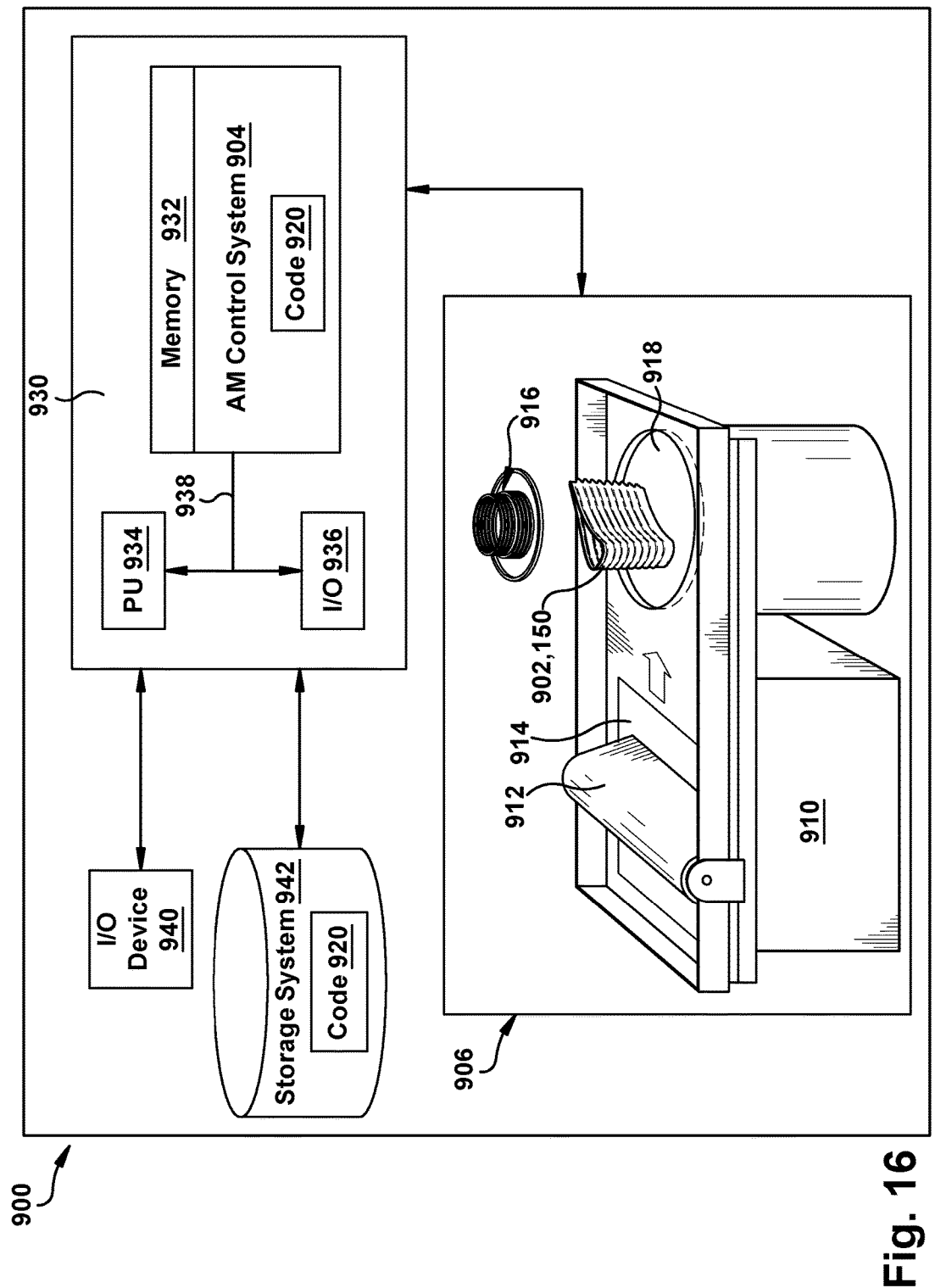
FIG. 16 shows a schematic illustration of an additive manufacturing process including a non-transitory computer readable storage medium storing code representative of a blade according to embodiments of the disclosure.

To illustrate an example of an additive manufacturing process, FIG. 16 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as blade 150 as described herein. AM system 900 generally includes a computerized additive manufacturing (AM) control system 904 and an AM printer 906. AM system 900, as will be described, executes code 920 that includes a set of computer-executable instructions defining blade 150 to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, blade 150 may be made of a metal or a metal compound. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer. AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of blade 150, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, touchscreen, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile smartphone, a personal data assistant, etc.

Additive manufacturing processes begin with a non-transitory computer readable storage medium (e.g., memory 932, storage system 942, etc.) storing code 920 representative of blade 150. As noted, code 920 includes a set of computer-executable instructions defining blade 150 that can be used to physically generate, among other things, corrugated surface(s) 166, 168, upon execution of the code by system 900. For example, code 920 may include a precisely defined 3D model of blade 150 and can be generated from any of a large variety of well known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to additive manufacturing language code, stored, etc., as necessary. Code 920 may be an input to system 900 and may come from a part designer, an intellectual property (IP) provider, a design company, the operator or owner of system 900, or from other sources. In any event, AM control system 904 executes (converted) code 920, dividing blade 150 into a series of thin slices that it assembles using AM printer 906 in successive layers of liquid, powder, sheet or other material. In the DMLM example, each layer is melted to the exact geometry defined by code 920 and fused to the preceding layer. Subsequently, blade 150 may be exposed to any variety of finishing processes, e.g., minor machining, sealing, polishing, assembly to other part of the blade, etc.

The corresponding structures, materials, acts, and equivalents in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A blade comprising:
   an airfoil body defined by a concave pressure side outer wall and a convex suction side outer wall that connect along a leading edge and a trailing edge; and
   at least one of:
      a first corrugated surface extending from the trailing edge to the leading edge on an outer surface of the concave pressure side outer wall, or
      a second corrugated surface extending from the trailing edge to the leading edge on an outer surface of the convex suction side outer wall,
   wherein the leading edge of the airfoil body includes a non-corrugated radial edge extending between the concave pressure side outer wall and the convex suction side outer wall.

2. The blade of claim 1, wherein the at least one of the first corrugated surface and the second corrugated surface includes both the first corrugated surface extending from the trailing edge to the leading edge on the outer surface of the concave pressure side outer wall, and the second corrugated surface extending from the trailing edge to the leading edge on the outer surface of the convex suction side outer wall.

3. The blade of claim 1, wherein the trailing edge includes a crenulated edge extending in an axially extending direction, the crenulated edge meshing with each of the first corrugated surface and the second corrugated surface.

4. The blade of claim 1, wherein the at least one of the first corrugated surface and the second corrugated surface has an inconsistent wavelength between a root and a tip of the blade.

5. The blade of claim 1, wherein the at least one of the first corrugated surface and the second corrugated surface has an inconsistent amplitude between a root and a tip of the blade.

6. The blade of claim 1, wherein the at least one of the first corrugated surface and the second corrugated surface has an inconsistent waveform between a root and a tip of the blade.

7. The blade of claim 1, wherein the first corrugated surface and the second corrugated surface include surfaces extending at no greater than 45° relative to a reference plane that is perpendicular to the leading edge.

8. The blade of claim 1, wherein the blade is additively manufactured.

9. The blade of claim 1, wherein the airfoil body further includes:
   a radially extending passage formed between the concave pressure side outer wall and the convex suction side outer wall that connect along the leading edge and the trailing edge.

10. The blade of claim 1, wherein the concave pressure side outer wall includes a non-corrugated surface extending between the leading edge and the trailing edge of the airfoil body.

11. The blade of claim 1, wherein the convex suction side outer wall includes a non-corrugated surface extending between the leading edge and the trailing edge of the airfoil body.

* * * * *